United States Patent [19]

Matsumoto et al.

[11] Patent Number: 4,761,463

[45] Date of Patent: Aug. 2, 1988

[54] THERMOPLASTIC RESIN COMPOSITION HAVING A MATTE APPEARANCE

[75] Inventors: Shigemi Matsumoto, Akashi; Fumiya Nagoshi, Kobe, both of Japan

[73] Assignee: Kanegafuchi Kagaku Kogyo Kabushiki Kaisha, Osaka, Japan

[21] Appl. No.: 843,358

[22] Filed: Mar. 24, 1986

[30] Foreign Application Priority Data

Mar. 25, 1985 [JP] Japan .................................. 60-60432

[51] Int. Cl.$^4$ ............................................. C08L 37/00
[52] U.S. Cl. ..................................... 525/74; 525/286
[58] Field of Search ........................................ 525/74

[56] References Cited

U.S. PATENT DOCUMENTS 4,129,608 12/1978 Murayama et al. ................... 525/74

*Primary Examiner*—Jacob Ziegler
*Attorney, Agent, or Firm*—Armstrong, Nikaido, Marmelstein & Kubovcik

[57] ABSTRACT

A thermoplastic resin composition having a matte appearance comprising:
(A) 80–5 parts by weight of a graft copolymer obtained by grafting 40–95 parts by weight of diene rubber with 60–5 parts by weight of vinyl compounds consisting of
  0.1–40 weight % of at least one glycidyl ester of an α- and β-unsaturated acid as an essential component,
  10–40 weight % of at least one vinyl cyanide compound,
  60–90 weight % of at least one aromatic vinyl compound, and
  0–30 weight % of other copolymerizable vinyl compounds, and
(B) 20–95 parts by weight of a copolymer obtained through reaction of
  10–40 weight % of at least one vinyl cyanide compound,
  60–90 weight % of at least one aromatic vinyl compound, and
  0–30 weight % of other copolymerizable vinyl compounds, the intrinsic viscosity of the resin composition in terms of its components which are soluble in methyl ethyl ketone being 0.25–1.5 dl/g (N,N'-dimethyl formamide solution, 30° C.).

3 Claims, No Drawings

THERMOPLASTIC RESIN COMPOSITION HAVING A MATTE APPEARANCE

BACKGROUND OF THE INVENTION

1. Field of the Invention

The present invention relates to a thermoplastic resin composition having a delustered or matte appearance, which is excellent in impact resitance, rigidity, antithermal deformation (stability against deformation by heat) and molding property.

2. Description of the Prior Art

ABS-type resins have been widely in use for various uses for their excellent impact resistance, thermal deformation resistance, molding property and fine surface lustre. Meanwhile, in the field of automobile upholstery, home electric appliances etc. there has been an increasing demand for parts with their surface delustered or made matte for a desired fine and quiet appearance, for a sense of high quality and for ensuring or improving safety through controlling reflection of light. For controlling luster and for making parts matte there are a number of conventional methods such as a method of improving the die's (mold's inside) surface, of coating with a delustering paint or mixing the resin with inorganic substances or rubbers. So far, however, no satisfactory results have been obtained by any of these methods. That is, improving the die's surface is accompanied by the difficulty of repairing and/or doing maintenance. Worse, the molded part's luster also depends on molding conditions, hence it is difficult to obtain molded parts constant in luster.

When an inorganic substance is added to a synthetic resin, this results in a marked drop of the resin's impact resistance, while addition of a rubber or rubbery matter causes lowering of rigidity, is likely to give rise to the so-called flow-mark or weld line, and after all it is difficult to obtain molded articles with excellent appearance. It is proposed to add to ABS resin copolymers of glycidyl methacrylate and ethylene, styrene, acrylonitrile ad acrylic ester etc. but even by this method lowering of impact resistance and molding property will result, also giving rise to color unevenness.

SUMMARY OF THE INVENTION

The purpose of the present invention is to provide a thermoplastic resin composition which has matte appearance and is excellent in impact resistance, rigidity, thermal deformation resistance and molding property.

The present inventors have discovered after their intensive studies that a composition obtained by combination of graft copolymer/s (A) containing special components and vinyl copolymer/s (B) has a matte appearance and is excellent in thermal properties and molding properties, and have thus arrived at the present invention.

DETAILED DESCRIPTION OF THE INVENTION

The present invention relates to a thremoplastic resin composition having a matte appearance comprising (A) 80-5 parts by weight of a graft copolymer obtained by grafting 40-95 parts by weight of diene rubber with 60-5 by weight parts of vinyl compounds consisting of 0.1-40 weight % of glycidyl ester of an α- and β- unsaturated acid as an essential component, 10-40 weight % of at least one vinyl cyanide compound, 60-90 weight % of aromatic vinyl compound and (B) 0-30 weight % of other copolymerizable vinyl compounds, and 20-95 weights parts of a copolymer obtained through reaction of 10-40 weight % of vinyl cyanide compound, 60-90 weight % of at least one aromatic vinyl compound, and 0-30 weight % of other copolymerizable vinyl compounds, the intrinsic viscosity of the resin composition in terms of its components which are soluble in methyl ethyl ketone is 0.25-1.5 dl/g (N,N-dimethyl formamide solution, 30° C.).

Particularly important in connection with this invention is graft copolymer (A). That is, when 60-5 parts by weight of vinyl compounds are caused to react with 40-95 parts by weight of diene rubber, 0.1-40 weight %, or, still more preferably, 0.5-30 weight %, based on the total quantity of vinyl compounds, of a glycidyl esterification product should be contained as an essential component, and (A) should be a graft copolymer obtained by grafting 10-40 weight % of a vinyl cyanide compound, 60-90 weight % of an aromatic vinyl compound, and 0-30 weight % of a copolymerizable vinyl compound, on said diene rubber in the presence of said glycidyl ester.

In this graft copolymer (A) the impact strength is lowered when the amount of diene-type rubber is less than 40 parts by weight. On the other hand, it is not advisable to increase it beyond 95 by weight parts, because the molding property of the resin is deteriorated. If the amount of glycidyl ester compound of α-,β- unsaturated acid is less than 0.1 weight %, no satisfactory matting effect is attainable, whereas, if it is in excess of 40 weight %, the molding property and impact resistance are undesirably deteriorated or lowered. If the amount of the vinyl cyanide compound should increase to be more than 40 weight %, thermal tinting will result at the time of molding. It is also not desirable that the amount is less than 10 weight %, for this results in lower impact resistance. If the amount of aromatic vinyl compound should be less than 60 weight %, deterioration of the molding property is bound to result, while, if it should be in excess of 90 weight %, the impact resistance undesirably decreases.

Although there is no particular limitation with regard to the diene rubber used in the manufacture of graft copolymer (A), its diene component should preferably be more than 50 weight % and the mean particle size should be within the range of 500 Å-2 μm.

Examples of suitable glycidyl esters of α-,β- unsaturated acids are glycidyl acrylate, glycidyl methacrylate, glycidyl ethacrylate etc.

Examples of suitable vinyl cyanide compounds are acrylonitrile, methacrylonitrile etc. Examples of suitable aromatic vinyl compounds are styrene, methyl styrene, chlorostyrene and α-methyl styrene.

Examples of suitable copolymerizable vinyl compounds are methyl methacrylate, ethyl methacrylate, acrylic acid, methacrylic acid, ethyl acrylate, butyl acrylate, phenyl maleimide etc.

In copolymer (B) of the present invention, the content of the vinyl cyanide compound is preferably 10-40 weight %. If the amount of the vinyl cyanide compound exceeds 40 weight %, undesirable discoloration in the course of molding occurs. The amount of the aromatic vinyl compound is preferably 60-90 weight %. If it is less than 60 weight %, the molding property deteriorates, while if it is in excess of 90 weight %, it results in an undesirably lowered impact resistance.

Examples of vinyl cyanide compounds suitable for the preparation of (B) are acrylonitrile, methacrylonitrile etc. Examples of aromatic vinyl compounds are styrene, methylstyrene, chlorostyrene, α-methyl styrene etc. Examples of copolymerizable vinyl compounds are acrylic acid, methacrylic acid, ethyl acrylate, methyl methacrylate, butyl acrylate, phenyl maleimide etc.

The above graft copolymer (A) and the copolymer (B) are preferably obtained by emulsion polymerization, but this does not necessarily mean limitation to emulsion polymerization. As to emulsion polymerization, any conventional method is applicable to this case of emulsion polymerization. That is, the above-mentioned compounds are caused to react with each other in an aqueous medium in the presence of a radical initiator. The above-mentioned compounds may as well be used as a mixture. If necessary, it is also possible to employ the above-mentioned compounds in proper portions. Further, as to the method of adding the above-mentioned compounds it is possible to add either all at once or in portions, and thus there are no particular limitations in this respect.

Suitable radical initiators are, among other, water-soluble or oil-soluble peroxides such as potassium persulfate, ammonium persulfate, cumene hydroperoxide, paramentan hydroperoxide etc. Besides, other polymerization accelerators, polymerization degree adjusters, emulsifiers etc. can be chosen from those widely used for the emulsion polymerization method.

The matte appearance, impact resistance, heat resistance, rigidity and molding property of the composition made from the graft copolymer (A) and the copolymer (B) depend not only on the composition and polymerization degree of the above-mentioned (A) and (B), but also on the blending ratio of the two. Hence, desired properties can be achieved by properly adjusting the blending ratio. Generally, however, it is preferred to blend 80–5 by weight parts of the graft copolymer (A) and 20–95 by weight parts of the copolymer (B). That is, if the portion of the graft copolymer (A) exceeds 80 by weight parts, the molding property, rigidity and resistance to thermal deformation are deteriorated or lowered, whereas if it is less than 5 by weight parts, the impact resistance is lowered.

The intrinsic viscosity of the composition of the present invention made up of the graft copolymer (A) and the copolymer (B) in terms of methyl ethyl ketone-soluble components is desirably in a range of 0.25–1.5 (N,N'-dimethyl formamide solution, 30° C.). When it is less than 0.25 dl/g, the mechanical strength such as impact resistance is lowered, while it is in excess of 1.5 dl/g, the molding processability decreases, these both being undesirable.

Blending, pelletizing and molding may be carried out by any of the known methods. It is possible to obtain a powder obtained by salting out, coagulating, dehydrating and drying a mixture of latexes of graft copolymer (A) and copolymer (B) and then have it kneaded under heating by e.g. rolls, screw, Banbury mixer, kneader etc. before molding. If necessary, it is possible to add some stabilizer, pigment, lubricant, anti-static agent etc. during blending. It is also possible to blend it with ordinary ABS resin, AS resin, polyvinyl chloride, polycarbonate etc.

The composition of the present invention obtained by the method described above has a matte appearance, and is excellent in impact resistance, stiffness, safety from thermal deformation and moldability.

Hereafter a concrete explanation of the present invention is to be made, referring to preferred embodiments (examples) of the invention. In these embodiments "part" by weight means part, and % means weight %.

EXAMPLES AND CONTROL EXAMPLES (a) Manufacture of graft copolymer (A)

The following substances were charged into a reaction tank equipped with a stirrer.

| | |
|---|---|
| Water | 250 parts |
| Sodium formaldehyde sulfoxylate | 0.3 part |
| Ferrous sulfate | 0.0025 part |
| Ethylene diamine tetraacetatebisodium | 0.01 part |

After deoxidation the above mixture in the reaction tank was heated to 60° C. under stirring, the compounds shown in Table 1 were continuously added dropwise for 5 hours, and after completion of the addition thereof, stirring was continued for 1 hour at 60° C. until completion of polymerization.

TABLE 1

| No. | Examples | | | | | Control | examples |
|---|---|---|---|---|---|---|---|
| | A-1 | A-2 | A-3 | A-4 | A-5 | A-6 | A-7 |
| Polybutadiene (parts) | 50 | 60 | 70 | 80 | — | 60 | 70 |
| SBR (parts) | — | — | — | — | 60 | — | — |
| Vinyl Compounds (parts) | 50 | 40 | 30 | 20 | 40 | 40 | 30 |
| GMA (%) | 10 | 5 | 10 | 15 | 3 | — | — |
| AN (%) | 20 | 15 | 20 | 25 | 25 | 50 | 5 |
| St (%) | 70 | 80 | 70 | 60 | 72 | 50 | 95 |
| CHP (part) | 0.3 | 0.3 | 0.3 | 0.2 | 0.3 | 0.3 | 0.3 |
| tDM (part) | 0.2 | 0.2 | — | — | — | 0.2 | — |
| Conversion rate (%) | 96 | 95 | 96 | 97 | 96 | 90 | 91 |

(Note)
SBR Styrene-butadiene copolymer
GMA Glycidyl methacrylate
AN Acrylonitrile
St Styrene
CHP Cumene hydroperoxide
tDM Tertiary dodecyl mercaptan (b) Manufacture of copolymer (B)

The following substances were charged into a reaction tank equipped with a stirrer.

| | |
|---|---|
| Water | 250 parts |
| Sodium laurylate | 3 parts |
| Sodium formaldehyde sulfoxylate | 0.4 part |
| Ferrous sulfate | 0.0025 part |
| Ethylene diamine tetraacetatebisodium | 0.01 part |

After deoxidation the compounds (I) shown in Table 2 were added after preheating to 60° C. under stirring in a nitrogen atmosphere. After completion of thorough emulsification the compounds (II) shown in Table 2 were added continuously dropwise for 6 hours. Then stirring was continued for 1 hour at 60° C. until polymerization was completed.

TABLE 2

| No. | | Examples | | |
|---|---|---|---|---|
| | | B-1 | B-2 | B-3 |
| Monomer (I) | αMSt (%) | 75 | — | — |

TABLE 3

| No. | Examples | | | | | Control examples | |
|---|---|---|---|---|---|---|---|
| | C-1 | C-2 | C-3 | C-4 | C-5 | C-6 | C-7 |
| A-1 (parts) | 40 | | | | | | |
| A-2 | | 30 | | | | | |
| A-3 | | | 20 | | | | |
| A-4 | | | | 20 | | | |
| A-5 | | | | | 25 | | |
| A-6 (parts) | | | | | | 30 | |
| A-7 | | | | | | | 30 |
| B-1 (parts) | | 70 | | 80 | | | |
| B-2 | 60 | | | | 75 | 70 | |
| B-3 | | | 80 | | | | 70 |
| Intrinsic viscosity | 0.58 | 0.53 | 0.72 | 0.55 | 0.61 | 0.63 | 0.68 |
| Heat distortion temp. (°C.) | 105 | 113 | 92 | 115 | 108 | 106 | 90 |
| Izod strength (kg · cm/cm) | 18 | 15 | 13 | 14 | 14 | 5 | 4 |
| Tensile strength (kg/cm$^2$) | 460 | 490 | 520 | 510 | 500 | 430 | 420 |
| Fluidity ($10^{-2}$ cc/sec.) | 10 | 8 | 20 | 12 | 14 | 3 | 21 |
| Reflectance (%) | 14 | 20 | 17 | 16 | 25 | 90 | 88 |

(Note
Heat distortion temperature ASTM D-648 18.6 kg/cm$^2$ load
Izod strength ASTM D-256, with notch, 23° C.
Tensile strength ASTM D-636
Fluidity "Koka" -type B-method flow, 260° C. load 100 kg/cm$^2$
Reflectance Reflectance at mirror surface angle of 60°

TABLE 2-continued

| No. | | Examples | | |
|---|---|---|---|---|
| | | B-1 | B-2 | B-3 |
| Monomer (II) | tDM (part) | 0.2 | — | — |
| | AN (%) | 22 | 20 | 30 |
| | αMSt (%) | 3 | 50 | — |
| | MMA (%) | — | 10 | — |
| | St (%) | — | 20 | 70 |
| | CHP (part) | 0.5 | 0.5 | 0.5 |
| | tDM (part) | 0.2 | 0.3 | 0.3 |

(Note)
αMSt α-methylstyrene
AN Acrylonitrile
St Styrene
MMA Methyl methacrylate
CHP Cumene hydroperoxide
tDM Tertiary dodecyl mercaptan (c) Manufacture of thermoplastic resin composition The graft copolymer (A) and the copolymer (B) manufactured by the methods described above under (a) and (b) were mixed in the form of latex at a given ratio, and an anti-oxidant was added to the mixed latex and after addition of calcium chloride for coagulation thereof, the resulting composition was rinsed with water, filtered, dried and pelletized for preparation of samples for measurement of physical properties. The results are shown in Table 3.

As is apparent from the data of Table 3, the compositions of the present invention C-1 to C-5 are matte in surface appearance, and are thermoplastic resin compositions outstanding in rigidity, resistance to thermal deformation and molding property.

What we claim is:

1. A thermoplastic resin composition having a matte appearance comprising: (A) 80-5 parts by weight of a graft copolymer obtained by grafting 40-95 parts by weight of diene rubber with 60-5 parts by weight of a vinyl component consisting of 0.1-40 weight % of a glycidyl ester of α- and β-unsaturated acid, 10-40 weight % of a vinyl cyanide compound, 60-90 weight % of an aromatic vinyl compound and 0-30 weight % of other copolymerizable vinyl compounds, and (B) 20-95 parts by weight of a copolymer obtained through reaction of 10-40 weight % of a vinyl cyanide compound, 60-90 weight % of at least one aromatic vinyl compound and 0-30 weight % of other copolymerizable vinyl compounds, the intrinsic viscosity of the resin composition in terms of its components which are soluble in methyl ethyl ketone being 0.25-1.5 (N,N'-dimethyl formamide solution, 30° C.).

2. The composition of claim 1, wherein the amount of said glycidyl ester of an α-,β-unsaturated acid used for preparing the graft copolymer (A) is 0.5-30 weight %, based on the total amount of vinyl compounds.

3. The composition of claim 1, wherein said diene rubber used for preparing the graft copolymer (A) contains not less than 50 weight % of diene component and has an average particle size of 500 Å-2 μm.

* * * * *